United States Patent [19]

Ängquist

[11] 4,386,396
[45] May 31, 1983

[54] SELF-COMMUTATED INVERTER

[75] Inventor: Lennart Ängquist, Enköping, Sweden

[73] Assignee: ASEA Aktiebolag, Västeras, Sweden

[21] Appl. No.: 328,552

[22] Filed: Dec. 8, 1981

[30] Foreign Application Priority Data

Dec. 23, 1980 [SE] Sweden .............................. 8009118

[51] Int. Cl.³ .......................................... H02M 7/515
[52] U.S. Cl. ................................................ 363/136
[58] Field of Search ............. 307/252 M; 363/96, 135, 363/136, 138

[56] References Cited

U.S. PATENT DOCUMENTS

Re. 26,342  2/1968  Bedford ............................... 363/138
4,255,783  3/1981  Messer .................................. 363/96

FOREIGN PATENT DOCUMENTS 55-37826  3/1980  Japan .................................. 363/136

Primary Examiner—William M. Shoop
Attorney, Agent, or Firm—Pollock, Vande Sande & Priddy

[57] ABSTRACT

A self-commutated inverter has two alternately conducting main branches which, in series with each other, are connected to a d.c. voltage source. The point of connection of the main branches constitutes the phase terminal of the inverter and a turn-off circuit is connected to this connection point. Each main branch includes a commutating inductor at least one of which is provided with an auxiliary winding. The auxiliary winding is connected in series with diodes means and this series connection is connected to the d.c. voltage source for feedback of surplus energy in a commutating circuit and symmetrization of commutating capacitor voltage.

6 Claims, 7 Drawing Figures

SELF-COMMUTATED INVERTER

BACKGROUND OF THE INVENTION

1. Field of the Invention

This invention relates to a self-commutated inverter of the kind having terminals for connection to d.c. voltage source means, two main branches connected in series with each other between two of said terminals, each main branch comprising first diode means, a main thyristor connected in anti-parallel with the first diode means, and a commutating inductor connected in series with the main thyristor and the first diode means, and turn-off circuit means connected between a point of connection arranged between the two main branches and at least one of said terminals, the turn-off circuit means comprising commutating capacitor means and thyristor means, controllable in both directions, connected to said commutating capacitor means.

2. Description of Prior Art

A prior art self-commutated inverter of the kind referred to is shown in FIG. 1. The inverter has three terminals A, B and C, the terminals A and B being intended for connection to the positive and negative poles, respectively, of a d.c. voltage source (shown in FIG. 1 as two series-connected d.c. voltage sources $U_U$ and $U_L$, each having the voltage ($U_D/2$), and the terminal C being intended for connection to a centre tap of the d.c. voltage source. The two series-connected main branches are connected between the terminals A and B, a first main branch comprising the commutating inductor $L_{DU}$ connected in series with the anti-parallel-connected main thyristor HU and a diode DU, and a second main branch comprising the commutating inductor $L_{DL}$ connected in series with the anti-parallel-connected main thyristor HL and a diode DL. The main thyristor and the diode in each main branch may consist of the same component and may possibly be integrated, i.e. formed in one and the same body of semiconducting material. The point of connection F of the two main branches constitutes a phase terminal of the inverter at which a pulsating potential generated by the inverter is obtained. FIG. 1 shows a load object L connected between the point of connection F and the terminal C for supplying the load object with alternating voltage. Alternatively, for example, two or three phase groups (each one designed according to FIG. 1) may be arranged to operate with a mutual phase displacement of 180° and 120°, respectively, and a single-phase or three-phase load object or an a.c. voltage network can then be connected to the phase terminal of the phase groups.

A turn-off circuit is connected between the point of connection F and the center tap of the d.c. voltage source. The turn-off circuit consists of two anti-parallel-connected turn-off thyristors SU and SL, a commutating capacitor $C_K$ and a commutating inductor $L_K$. The two anti-parallel-connected turn-off thyristors SU and SL may, of course, be replaced by a bidirectional thyristor (triac) or by another component or connection which is controllable in both directions. The commutating inductor $L_K$ may be omitted and the entire commutating inductance be formed by the inductors $L_{DU}$ and $L_{DL}$, each having the inductance $L_D$.

The mode of operation of the inverter shown in FIG. 1 will be clear from the schematic curves shown in FIG. 2, which are valid for no load operation and show the commutating capacitor voltage $U_C$, the turn-off current $i_S$ and the voltage $U_{LD}$ across the commutating inductor $L_{DU}$. To start with the thyristor HU is conducting and the commutating capacitor $C_K$ is charged to the voltage $U_C=U_D$. At $t=t_1$, the turn-off thyristor SU is ignited, the main thyristor HU is turned off, and the oscillating circuit $L_K$-$C_K$-$L_{DU}$ completes half a cycle of an oscillation. The oscillating current flows through the components $L_K$, $C_K$, SU, DU, $L_{DU}$ and $U_U$. The voltage $U_{LD}$ across the inductor $L_{DU}$ has the amplitude $$\frac{L_D}{L_D + L_K} \cdot \frac{U_D}{2}$$

and is thus determined by the inductances of the commutating inductors.

At $t=t_2$, the thyristor HL is ignited and the oscillating circuit $L_K$-$C_K$-$L_{DL}$ performs half a cycle of an oscillation. At $t=t_3$, the oscillation is completed and the commutating capacitor $C_K$ has the voltage $U_C=-U_D$.

At $t=t_4$, a new commutation is started by ignition of the thyristor SL and thereafter, at $t=t_5$, the thyristor HU is ignited. At $t=t_6$, the commutation is completed.

The delay between the ignition of a turn-off thyristor and the subsequent ignition of a main thyristor is designated $t_d$ in FIG. 2.

In the inverter of FIG. 1, the final value of the commutating capacitor voltage $U_C$ after completed commutation is largely independent of the magnitude of the load current $i_B$ of the inverter if the time delay $t_d$ is given a suitable constant value. This type of inverter is normally stable, and particular circuits for feedback of commutating power are not required and are normally not provided. However, the inverter connection has a drawback in that the final capacitor voltage easily becomes asymmetric, i.e. assumes a high value ($U_C>U_D$) after every second commutation and a low value ($U_C<U_D$) after the intermediate commutations. This condition is shown in FIG. 3 and may result in the turn-off capacitor becoming so low, during the half cycles when $U_C$ is negative, that the load current cannot be commutated. The only mechanism that controls the capacitor voltage towards symmetry, during no load operation, is the oscillation losses of the inverter connection which, especially in connection with high power inverters, must be held low. The control towards symmetry therefore often becomes so weak that the commutating capacity is lost. Asymmetry of the commutating capacitor voltage may be caused by pulsations of the voltage of the d.c. voltage source, by the load current or by asymmetries in the circuit design. For example, in inverters for higher power, pulsations of the intermediate link voltage are difficult to avoid. This is especially true when supplying the intermediate link from a single-phase network, for example during vehicle operation. During each commutation, the capacitor voltage is easily displaced a certain amount in a direction towards asymmetry. These displacements are accumulated and the result is that the capacitor voltage rapidly becomes so asymmetric that the commutating capacity is lost, resulting in breakdown of operation.

The present invention aims to provide a self-commutated inverter of the kind referred to, in which the commutating capacitor voltage under all operating conditions is well-defined and substantially symmetric, and in which, therefore, the commutating capacity of the inverter, and therefore its operability, is ensured.

SUMMARY OF THE INVENTION

According to the present invention a self-commutated inverter having terminals for connection to d.c. voltage source means, two main branches connected in series with each other between two of said terminals, each main branch comprising first diode means, a main thyristor connected in anti-parallel with the first diode means, and a commutating inductor connected in series with the main thyristor and the first diode means, and turn-off circuit means connected between a point of connection arranged between the two main branches and at least one of said terminals, the turn-off circuit means comprising commutating capacitor means and thyristor means, controllable in both directions, connected to said commutating capacitor means, wherein one of said commutating inductors is provided with a first auxiliary winding which is connected, by way of second diode means, between two of said terminals.

BRIEF DESCRIPTION OF THE DRAWINGS

The invention will now be described, by way of example, with reference to the accompanying drawings, in which.

DESCRIPTION OF THE PREFERRED EMBODIMENTS

Figure 4:
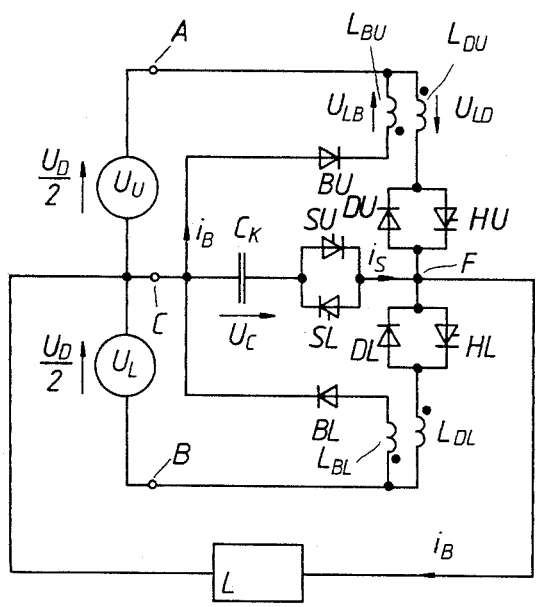
FIG. 4 is a circuit diagram of one embodiment of an inverter according to the invention.
Figure 5:
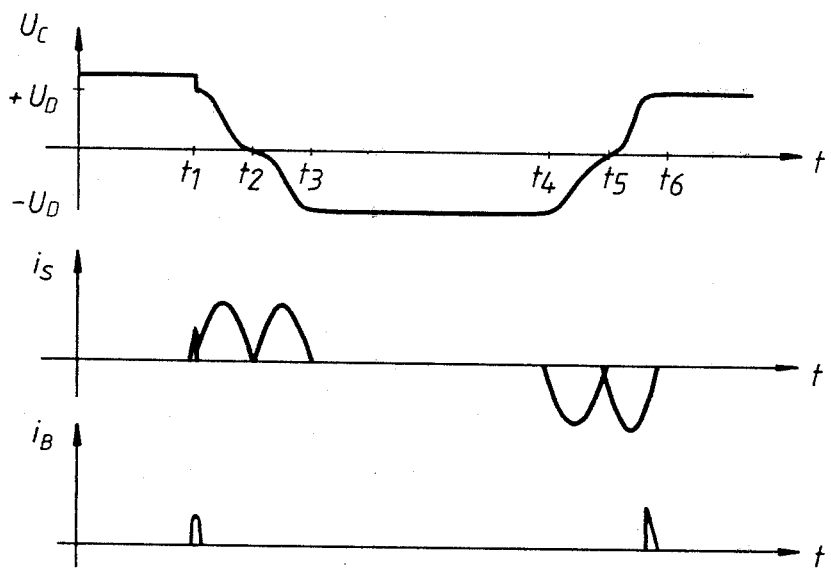
FIG. 5 is a graphic representation of certain operating quantities occurring in the inverter according to FIG. 4 as functions of time.
Figure 6:
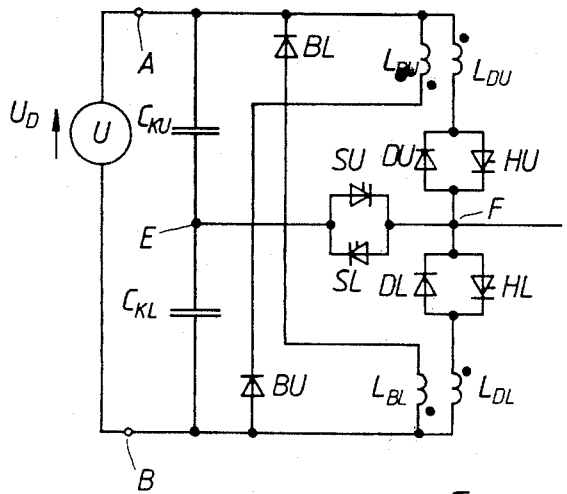
FIG. 6 is a circuit diagram of another embodiment of an inverter according to the invention.

In FIGS. 4 to 6 two embodiments of inverter according to the invention are described. These inverters are similar in many respects to the previously described prior art inverter shown in FIG. 1 and, where possible in the ensuing description, similar references have been employed to identify corresponding parts of the inverters according to the invention (shown in FIGS. 4 and 6) and the prior art inverter (shown in FIG. 1). Furthermore parts of the inverters shown in FIGS. 4 and 6 will not be described in great detail where corresponding parts have been described with reference to the prior art inverter shown in FIG. 1.

Figure 1:
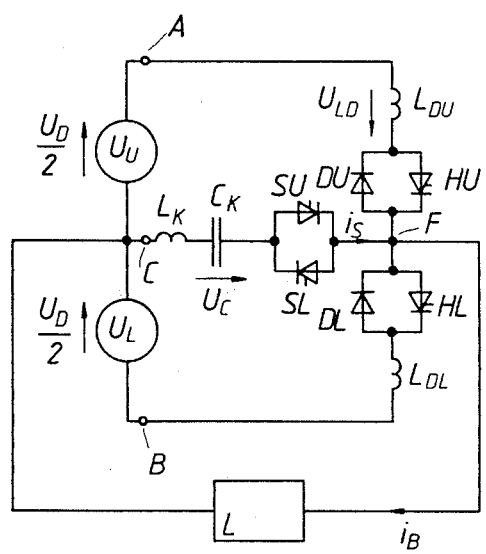
FIG. 1 is a circuit diagram of a prior art inverter.
Figure 2:
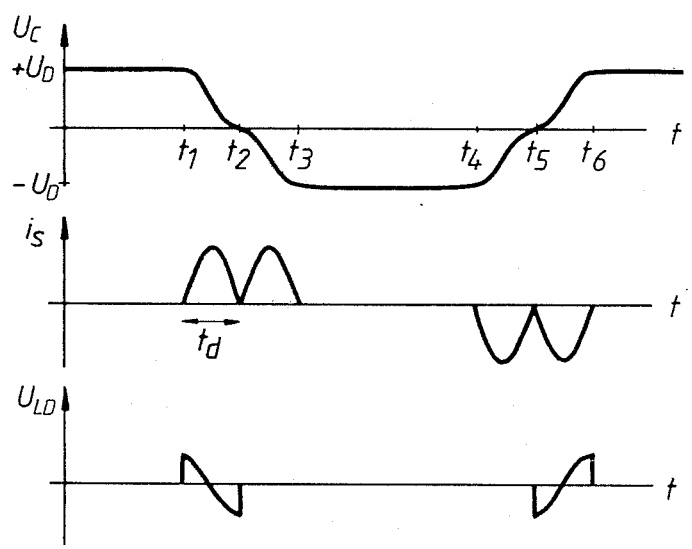
FIG. 2 is a graphic representation of some of the quantities, occurring in the inverter according to FIG. 1, as functions of time, under idealized symmetric operating conditions.
Figure 3:
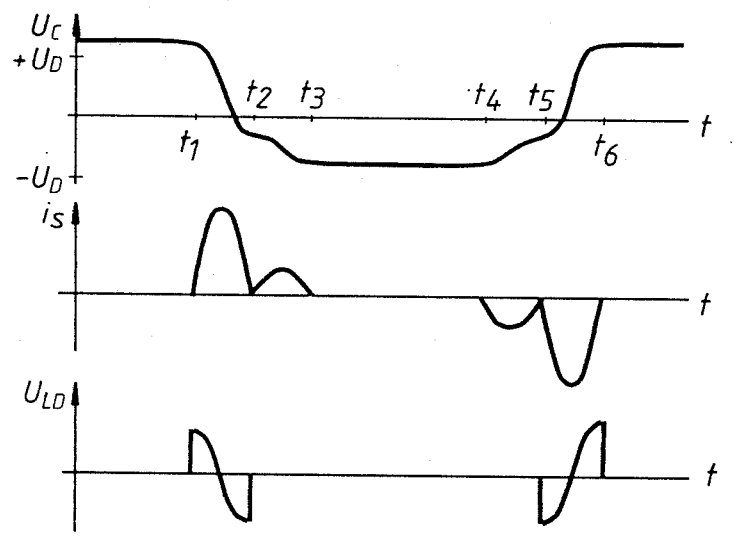
FIG. 3 is a graphic representation of the same quantities as shown in FIG. 2 for the inverter according to FIG. 1 but operating at asymmetrical commutating capacitor voltage.

FIG. 4 shows one embodiment of an inverter according to the invention which differs from the prior art inverter shown in FIG. 1 in that both its commutating inductors $L_{DU}$ and $L_{DL}$ are provided with auxiliary windings $L_{BU}$ and $L_{BL}$, respectively. The winding $L_{BU}$ is connected in series with a diode BU, the series-connected winding $L_{BU}$ and the diode BU being connected between the terminals C and A. The winding $L_{BL}$ is connected in series with a diode BL, the series-connected winding $L_{BL}$ and the diode BL being connected between the terminals B and C. The diodes BU and BL are oriented in such a way that they block the direct voltage from the d.c. voltage sources $U_U$ and $U_L$. The inductors $L_{DU}$, $L_{BU}$ and $L_{DL}$, $L_{BL}$ are designed, for example, as air-core coils. Typically the inductance of the main windings $L_{DU}$ and $L_{DL}$ is, for example, from 10-20 μH. The auxiliary windings $L_{BU}$ and $L_{DU}$ are suitably given a somewhat higher number of turns than the main windings. The coefficient of inductive coupling between the main and auxiliary windings of each of the inductors is suitably made relatively high (e.g. k=0.8 or k=0.9).

In the inverter according to FIG. 4, there is no inductor $L_K$ (as in the prior art inductor of FIG. 1), the entire commutating inductance being formed by the inductors $L_{DU}$ and $L_{DL}$. This is advantageous, particularly in high power inverters where a fault-causing simultaneous conduction of both main thyristors in the inverter will only result in moderate fault currents. Otherwise, the inverter shown in FIG. 4, and its mode of operation correspond to the inverter shown in FIG. 1.

Upon ignition of the turn-off thyristor SU, the voltage across the winding $L_{DU}$ will initially be $$u_{LD} = u_C - \frac{U_D}{2}.$$

This causes a voltage $$u_{LB} = \frac{M}{L_D} \cdot u_{LD}$$

to be induced in the winding $L_{BU}$, where M is the mutual inductance between the main and auxiliary windings and $L_D$ is the inductance of the main winding. If $U_{LB} > U_D/2$, i.e. if $$u_C > \left(1 + \frac{L_D}{M}\right) \cdot \frac{U_D}{2},$$

a current will flow through the diode BU and the auxiliary winding $L_{BU}$ to the d.c. voltage source $U_U$. When the capacitor voltage tends to become too high, the surplus energy in the commutating circuit will be fed back to the d.c. voltage source. This stabilizes the circuit, and asymmetry of the capacitor voltage is prevented.

FIG. 5 shows the quantities $U_C$, $i_S$ and $i_B$ as functions of time in the inverter according to FIG. 4. At $t=t_1$, it is assumed that the capacitor voltage is too high relative to $U_D$, which, for example, may have been caused by $U_D$ having been reduced since the preceding commutation. When the turn-off thyristor SU is ignited, the surplus energy of the capacitor is rapidly fed back to the source by means of the limiting circuit BU-$L_{BU}$. The capacitor voltage drops rapidly to $U_C \simeq U_D$, whereupon the commutating process continues in the manner described previously, and upon completed commutation $U_C \simeq U_D$, i.e. the occurrence of an asymmetry has been prevented. At the end of the next commutation (which is started at $t=t_4$), it is assumed that the capacitor voltage is on its way towards too high a final value relative to $U_D$, which, for example, may have been caused by $U_D$ having increased again since the preceding commutation. At the end of the oscillation, when $U_C \simeq U_D$, the limiting circuit BU-$L_{BU}$ is then activated, the current in $L_{DU}$ is transferred to the auxiliary winding $L_{BU}$ and the surplus of magnetic energy is returned to the d.c. voltage source.

FIG. 6 shows an alternative embodiment of an inverter according to the invention which has the advantage of not requiring a center tap in the d.c. voltage source U. The commutating capacitor is divided into two parts $C_{KU}$ and $C_{KL}$ which are connected to a point of connection E to which the turn-off thyristors SU and SL are also connected. The limiting circuits BU-$L_{BU}$ and BL-$L_{BL}$, respectively, are connected between terminals A and B. The number of turns of the auxiliary windings $L_{BU}$ and $L_{BL}$ are, in this case, chosen to be approximately at least twice as great (suitably somewhat more than twice as great) as the number of turns of the main windings. The phase terminal F is connected to a corresponding terminal of a load object or a.c. voltage network. In all essential parts the inverter according to FIG. 6 operates in the same manner as the inverter shown in FIG. 4.

Figure 7:
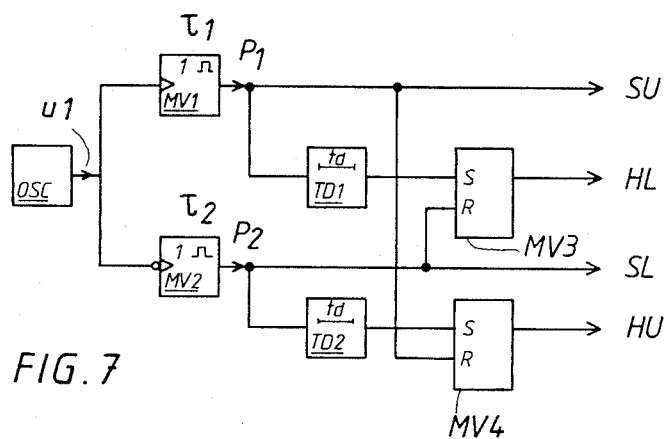
FIG. 7 is a block diagram of one example of a control device for an inverter according to the invention.

FIG. 7 shows a control device for a single-phase inverter according to the invention. An oscillator OSC delivers a square-wave voltage $u_1$ with a frequency which is equal to the frequency of the desired inverter output voltage. The voltage $u_1$ is supplied to two monostable circuits MV1 and MV2 with dynamic inputs (negated in the circuit MV2). At each transition $0 \rightarrow 1$ of the voltage $u_1$, the circuit MV1 delivers a pulse $p_1$ with the duration $\tau_1$, and at each transition $1 \rightarrow 0$, the circuit MV2 delivers a pulse $p_2$ with the duration $\tau_2$ (typically $\tau_1 = \tau_2$). These pulses are supplied to the turn-off thyristors SU and SL for turning off these thyristors, as well as to the delay circuits TD1 and TD2 each having a time delay $t_d$. The output signals from the delay circuits TD1 and TD2 are supplied to the bistable circuits MV3 and MV4, respectively. The bistable circuits MV3 and MV4 are set by the output signals of the delay circuits and thereupon deliver control pulses to the main thyristors HL and HU, respectively. The circuit MV3 is reset by the output signal $p_2$ from the circuit MV2, and the circuit MV4 is reset by the output signal $p_1$ from the circuit MV1. The control pulses $p_1$ and $p_2$ to the turn-off thyristors may be short, and $\tau_1$ and $\tau_2$, may, for example, be of the order of magnitude of 10 μs. The control pulses to the main thyristors have a duration which is approximately half a cycle of the voltage $u_1$, i.e. of the output voltage of the inverter.

In the foregoing description, an inverter with only one phase group has been described. However, an inverter may be composed, in a known manner, of two, three or more phase groups of the kind described above.

The specific embodiments of inverter, according to the invention, described above may be modified in many ways within the scope of the following claims.

What is claimed is:

1. A self-commutated inverter having:

terminals for connection to d.c. voltage source means, two main branches connected in series with each other between two of said terminals, each main branch comprising first diode means, a main thyristor connected anti-parallel with the first diode means, and a commutating inductor connected in series with the main thyristor and the first diode means, and turn-off circuit means connected between a point of connection between the two main branches and at least one of said terminals, the turn-off circuit means comprising commutating capacitor means and thyristor means, controllable in both directions, connected to said commutating capacitor means, wherein one of said commutating inductors is provided with a first auxiliary winding which is connected, by way of second diode means, between one of said terminals and one side of said commutating capacitor means providing a symmetrical commutation voltage on said capacitor means and delivering excessive commutation energy to said voltage source means.

2. An inverter according to claim 1, in which the other of said commutating inductors is provided with a second auxiliary winding which is connected, by way of third diode means, between one of said terminals and said one side of said commutating capacitor means.

3. An inverter according to claim 2, which has first, second and third ones of the said terminals, and in which said first auxiliary winding and said second diode means are connected in series between said first and second terminals and said second auxiliary winding and said third diode means are connected in series between the said second and third terminals.

4. A self-commutated inverter comprising a pair of terminals for connection to a d.c. voltage source means;

two main branches connected in series with each other between said terminals, each main branch including a main thyristor serially connected with a commutating inductor and a diode means parallel connected to said main thyristor;

a pair of commutating capacitors each having one end connected together and remaining ends connected between said pair of terminals;

a turn-off circuit means connected between said one end of said capacitors and the junction of said two main branches;

an auxiliary winding on each of said commutating inductors serially connected with diode means, said auxiliary windings and serially connected diodes each connected in parallel between said commutating capacitors' remaining ends whereby a symmetric commutation voltage is provided for each of said commutating capacitors and excess commutation energy is delivered to said voltage source means.

5. A self-commutated inverter comprising first, second and third terminals for connection to a d.c. voltage source means;

a pair of main switching branches serially connected between first and third of said terminals, each switching branch comprising a commutation inductor serially connected to a main thyristor, each thyristor being parallel connected with a first diode;

a turn-off circuit connected between said second terminal and the junction of said switching branches including a commutation capacitor and thyristor means serially connected;

an auxiliary winding on each of said commutation inductors, each auxiliary winding serially connected with second diode means, said auxiliary windings and second diode means providing first and second circuit paths between one end of said commutating capacitor and said first and third terminals, whereby said commutation capacitor provides a symmetrical commutation voltage and excess commutation energy is delivered to said d.c. voltage source means.

6. An inverter according to claims 1, 7 or 8, in which the thyristor means comprises two mutually anti-parallel-connected turn-off thyristors.

* * * * *

UNITED STATES PATENT AND TRADEMARK OFFICE
CERTIFICATE OF CORRECTION

PATENT NO. : 4,386,396
DATED : May 31, 1983
INVENTOR(S) : Lennart Angquist

It is certified that error appears in the above—identified patent and that said Letters Patent is hereby corrected as shown below:

In column 6, line 65, delete "7 or 8" and insert therefor --4 or 5--.

Signed and Sealed this

First Day of November 1983

[SEAL]

Attest:

Attesting Officer

GERALD J. MOSSINGHOFF
Commissioner of Patents and Trademarks